Feb. 5, 1963 W. D. BEHLEN 3,076,403
MEANS FOR MAINTAINING SUBSTANTIALLY ATMOSPHERIC
PRESSURE INSIDE SEALED HOUSINGS
Filed June 20, 1960 2 Sheets-Sheet 1
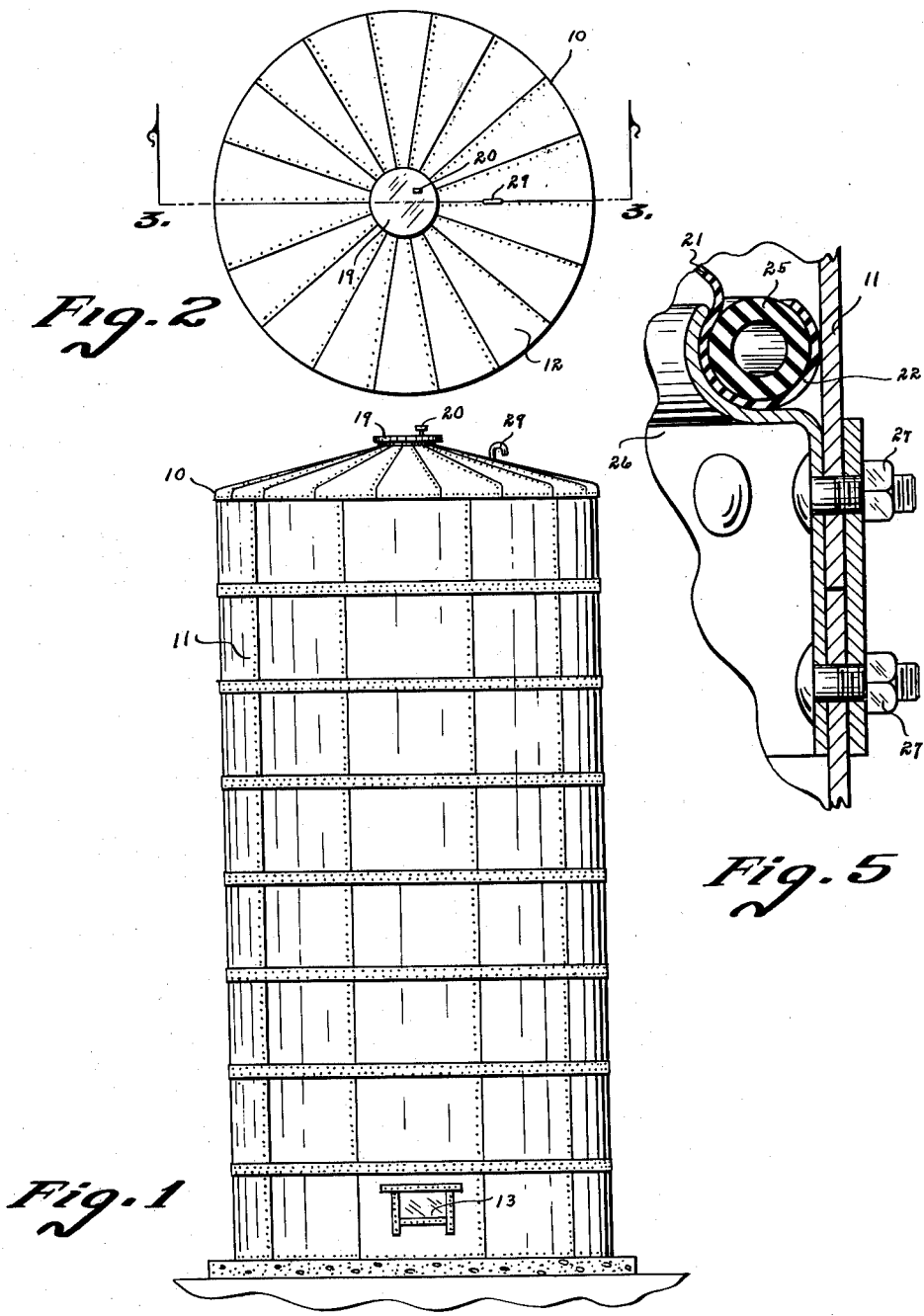
INVENTOR
WALTER D. BEHLEN
BY Talbert Dick & Darley
ATTORNEYS
WITNESS
NORMAN G. TRAVISS

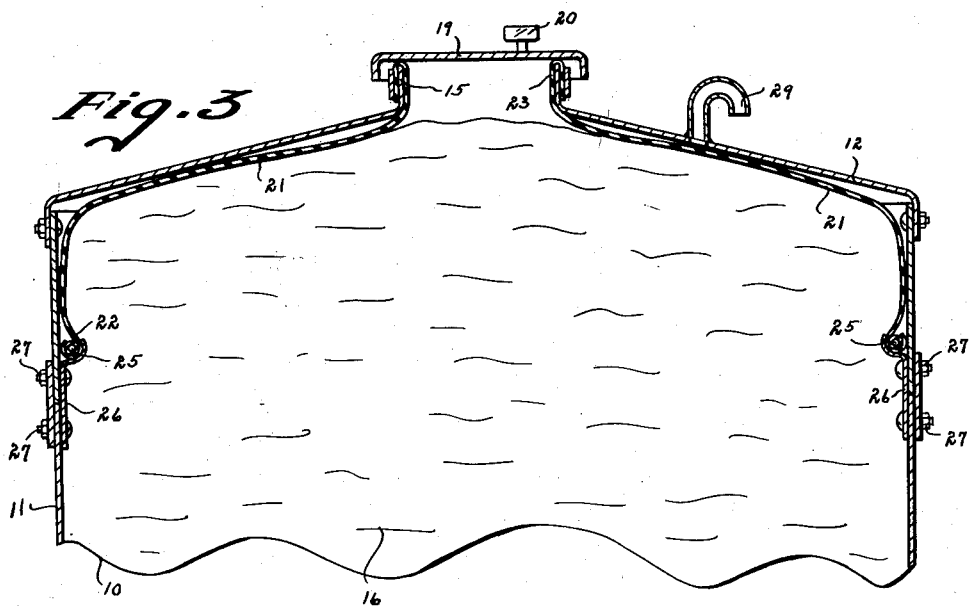
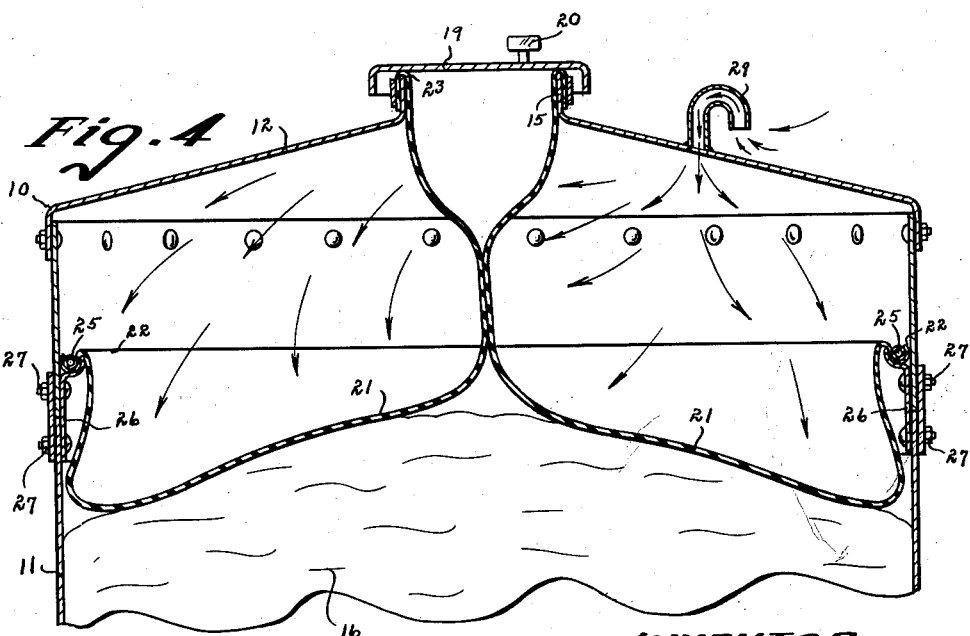

United States Patent Office 3,076,403
Patented Feb. 5, 1963

3,076,403
MEANS FOR MAINTAINING SUBSTANTIALLY ATMOSPHERIC PRESSURE INSIDE SEALED HOUSINGS
Walter D. Behlen, Columbus, Nebr., assignor to Behlen Manufacturing Company, Inc., Columbus, Nebr., a corporation of Nebraska
Filed June 20, 1960, Ser. No. 37,232
2 Claims. (Cl. 99—235)

This invention relates to a means for maintaining substantially atmospheric pressure inside sealed housings such as farm crop holding silos and the like.

It is often desirable in the use of certain sealed containers and housings to maintain an inside atmospheric pressure substantially that of the outside atmospheric pressure. This is especially true of silo or like structures for preserving farm crops. In such buildings the farm crop is placed therein when in a green state. The cells of the crop material continue to respire and quantities of gases are produced, including carbon dioxide gas. It is highly desirable that this carbon dioxide gas be retained within the silo so that fermentation will continue. Obviously if outside air is permitted to enter the silo, and the carbon dioxide gas to leave the silo, the free oxygen will promote mold growths and the silage will rapidly spoil and deteriorate. It is, therefore, highly necessary that the silo be substantially hermetically sealed from the outside air. If the silo is not so sealed, temperature changes will continuously cause air or gases to flow from the silo or into the silo, depending on the minus or plus differential between the outside atmospheric pressure and the atmospheric pressure in the inside of the silo. Some effort has been made to maintain equal atmospheric pressures inside and outside of silos. However, such devices are complicated, costly to install, and interfere with the filling of the silo with the farm crop.

Therefore, one of the principal objects of my invention is to provide a means for automatically equalizing the atmospheric pressures inside and outside of silos and like structures.

A further object of this invention is to provide an atmospheric equalizing device for silos or like that is easily and quickly installed.

A still further object of this invention is to provide an atmospheric equalizing means for silos and like that, after installation, does not interfere with the filling of the silo or like with the crop product.

A still further object of this invention is to provide a crop storage means that prevents the mixture of outside air with gases inside the structure.

A still further object of this invention is to provide a means for preserving farm crops within closed structures that automatically compensates for changes of both barometic pressure and temperatures.

A still further object of this invention is to provide a pressure equalizing device for silos that protects the silo against distortion or breakage due to pressure changes.

A still further object of my invention is to provide an atmospheric pressure equalizing means for silos that automatically compensates for the withdrawal of certain amounts of crop materials from the silo.

Still further objects of my invention are to provide a pressure equalizing means for silos and like that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of a silo or like structure equipped with my atmospheric pressure equalizing means;

FIG. 2 is a top plan view of a silo with my device installed therein;

FIG. 3 is an enlarged side sectional view of my device installed in a silo and is taken on line 3—3 of FIG. 2;

FIG. 4 is an enlarged side sectional view of my device installed in the upper portion of a silo and more fully illustrates its construction; and FIG. 5 is an enlarged sectional view of one method of securing the lower skirt edge portion of my device to the inside circular wall of a silo or like.

Inasmuch as my device is particularly adapted for use with the silos, I will describe its installation and structure as that of an equalizing device associated with a common and well-known silo building.

In the drawings I have used the numeral 10 to generally designate a tubular silo having the continuous circular wall 11 and top 12. The numeral 13 designates a door in the bottom portion of the silo for the removal of the stored farm crop. Such silos have a centrally located top neck opening 15 and it is through this neck opening that the farm crop 16 is introduced for storage within the silo. After the crop has been placed in the silo, the neck opening 15 is sealed by any suitable means such as the cap lid 19. These lid caps 19 may be rigidly detachably secured in closed position by any suitable means and usually has a safety or relief valve 20 communicating with the inside of the silo.

It is to such a building structure that I install my device and which I will now describe in detail.

The numeral 21 designates a sheet skirt member of suitable flexible material such as certain plastics, rubber and like. I recommend that the sheet skirt member have a certain amount of resiliency in order that it can expand or contract without breaking. Regardless, however, of the flexible material used, it must be substantially impervious to air or gases. Each sheet skirt member is of circular construction having a lower skirt edge portion 22 and a centrally located upwardly extending waist or neck portion 23. The diameter of the sheet skirt member 21 is greater than that of the inside diameter of the silo as shown in FIG. 4. To install my device, it is inserted in the upper portion of the silo with the waist or neck portion 23 extending through the silo neck 15 and then folded outwardly and downwardly around the silo neck 15 as shown in FIG. 3. The inside diameter of the neck or waist portion 23 of the skirt is only slightly less than that of the diameter of the neck 15 of the silo. By this construction, when the lid cap 19 is securely fastened on and over the neck of the silo, the upper and inner area of my flexible skirt will be rigidly secured and sealed in and to the neck of the silo. The lower outer edge or hem portion 22 of the skirt is secured by any suitable means to the inside of the wall of the silo. This point of attachment of the hem portion of the skirt to the silo is in the upper end portion of the silo but is a substantial distance below the neck of the silo as shown in FIG. 4. Obviously, this lower end portion of my sheet skirt must be not only rigidly attached to the inside of the wall of the silo but must be continuously sealed around its entire periphery. One good way of accomplishing this is to roll the hem portion of the skirt around a continuous rope, hose, rubber bead or like 25, and then have this rolled edge detachably secured by bolt and clamp means as shown in FIG. 5. I have used the numeral 26 to designate such clamp means which consists of a vertical portion and an upper curved flange portion for engaging and wedging between it and the inside of the silo wall and the skirt roll. These clamp members 26 are detachably secured to the inner side of the silo wall by bolt means 27. When the bolt means are in loosened condition, the rolled hem end of the skirt is placed between the upper portions of the clamps as shown in FIG. 5 and then by tightening the bolt means the clamp will be drawn in a direction toward the inside of the silo wall, thus rigidly detachably clamping and sealing the lowered marginal edge portion of the skirt to the inside of the silo wall. To complete my installation I install an air vent 29 in the top of the silo as shown in FIG. 4. If desired, this air vent may be adjustably valve controlled. When my equalizing means has been so installed, the outside atmosphere is in communication with the inside top of the silo but this communication is above the flexible skirt. By the flexible skirt having a neck or waist opening at the neck of the silo, material may be introduced in the silo without in any way interfering with my pressure equalizing means. If there is a minus atmospheric pressure inside the sealed silo, air will enter through the vent 29 and my skirt means will expand as shown in FIG. 4 until the atmospheric pressure inside the silo is equal to that of the atmospheric pressure outside the silo. On the other hand, if there is a plus pressure inside the silo and below my skirt member, the skirt member will collapse as shown in FIG. 3 thereby discharging an amount of air through the vent 29 until the pressure inside the silo equals that of the atmospheric pressure on the outside of the silo. From this description it will readily be seen that a silo so equipped with my device may breathe and, therefore, automatically equalize pressures inside and outside the silo. This obviously is accomplished without the farm crop in the silo contacting the outside atmosphere.

Some changes may be made in the construction and arrangement of my means for maintaining substantially atmospheric pressure inside sealed housings without departing from the real spirit and purpose of my invention, and it is my intention to cover by my claims, any modified forms of structure or use of mechanical equivalents which may be reasonably included within their scope.

I claim:
1. A silo for the storage of forage crops comprising,
   a container having an upstanding wall of a cylindrical shape,
   a cover for enclosing the wall at the top thereof and having a normally closed, central opening therein for use in filling the container with the crops, said cover having further a normally open opening formed therein spaced radially outwardly from said inlet opening,
   said wall having a normally closed opening near the bottom thereof,
   a flexible sheet impervious to air and moisture having an outer peripheral edge, and said sheet having further an opening centrally thereof to form an inner peripheral edge,
   said inner peripheral edge secured in a sealed manner completely about the perimeter of said inlet opening,
   and clamp means sealing said outer peripheral edge of said sheet completely to the interior of said wall below said inlet opening.

2. In a container for the storage of forage crops having a normally closed, central inlet opening at the top thereof, and having a normally closed discharge opening near the bottom thereof, and having further a chamber formed therein for holding a variable quantity of the crops, apparatus for maintaining substantially atmospheric pressure in the chamber between the crops and the top of the interior of the container, said apparatus comprising,
   a circular flexible sheet impervious to air and moisture and having an opening centrally therein to form an inner peripheral edge, said sheet having an outer peripheral edge,
   said inner peripheral edge secured in a sealed manner completely about the perimeter of said inlet opening,
   said outer peripheral edge secured in a sealed manner completely about the interior of said container below said inlet opening,
   and air passage means secured to said container at the top thereof and spaced from said inlet opening, said air passage means adapted to transmit air between the exterior of the container and the interior thereof between said sheet and the top of said container.

References Cited in the file of this patent
UNITED STATES PATENTS

| | | |
|---|---|---|
| 1,690,072 | Johnson | Oct. 30, 1928 |
| 1,950,327 | Punte | Mar. 6, 1934 |
| 2,430,905 | Bradley | Nov. 18, 1947 |
| 2,722,171 | Deringer | Nov. 1, 1955 |
| 2,787,321 | Dietz | Apr. 2, 1957 |